United States Patent
Fuchs (10) Patent No.: US 10,486,326 B2
(45) Date of Patent: Nov. 26, 2019

(54) POWER TOOL SYSTEM

(75) Inventor: Rudolf Fuchs, Neuhausen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/002,837

(22) PCT Filed: Mar. 2, 2012

(86) PCT No.: PCT/EP2012/000953
§ 371 (c)(1),
(2), (4) Date: Nov. 13, 2013

(87) PCT Pub. No.: WO2012/116841
PCT Pub. Date: Jul. 9, 2012

(65) Prior Publication Data
US 2014/0053417 A1 Feb. 27, 2014

(30) Foreign Application Priority Data
Mar. 3, 2011 (DE) .................. 10 2011 005 015

(51) Int. Cl.
B27B 17/00 (2006.01)
B23D 57/02 (2006.01)
B27B 17/02 (2006.01)
B27B 17/08 (2006.01)

(52) U.S. Cl.
CPC ........ B27B 17/0083 (2013.01); B23D 57/023 (2013.01); B27B 17/02 (2013.01); B27B 17/086 (2013.01)

(58) Field of Classification Search
CPC . B27B 17/0016; B27B 17/0083; B27B 17/02; B27B 17/086; B23D 57/0076; B23D 57/023

USPC ....... 30/122, 123.4, 381–383, 390–391, 369; 83/750
See application file for complete search history.

(56) References Cited

U.S. PATENT DOCUMENTS 83,350 A * 10/1868 Wolfinger et al. ................. D8/5
285,651 A * 9/1883 Mock .................... B27B 17/025
30/387

(Continued)

FOREIGN PATENT DOCUMENTS

CH 221661 6/1942
CN 2753545 Y 1/2006

(Continued)

OTHER PUBLICATIONS

International Search Report corresponding to PCT Application No. PCT/EP2012/000953, dated Aug. 6, 2012 (German and English language document) (7 pages).

*Primary Examiner* — Laura M Lee
(74) *Attorney, Agent, or Firm* — Maginot, Moore & Beck LLP (57) ABSTRACT

A power tool system includes at least one power tool separation device and at least one portable power tool. The power tool separation device includes at least one cutting unit and at least one guide unit which forms a closed system at least together with the cutting unit. The portable power tool includes a motor unit configured to be coupled to the cutting unit of the power tool separation device. At least in the mounted state, a longitudinal axis of the motor unit extends at least essentially perpendicular to the longitudinal axis of the guide unit.

12 Claims, 4 Drawing Sheets

(56) References Cited

U.S. PATENT DOCUMENTS

| | | | | |
|---|---|---|---|---|
| 1,412,315 | A * | 4/1922 | Peters | B27B 17/086 |
| | | | | 83/831 |
| 1,530,682 | A * | 3/1925 | Lyman | B23D 53/12 |
| | | | | 30/380 |
| 1,642,145 | A * | 9/1927 | Ferguson | B27B 17/00 |
| | | | | 83/834 |
| 1,955,063 | A * | 4/1934 | Greitzer | B23D 53/12 |
| | | | | 30/380 |
| 2,064,676 | A * | 12/1936 | MacLeod | B23D 49/006 |
| | | | | 30/242 |
| 2,349,573 | A * | 5/1944 | Anderson | B27B 17/02 |
| | | | | 30/520 |
| 2,532,981 | A * | 12/1950 | Wolfe | B27B 17/02 |
| | | | | 267/182 |
| 2,593,760 | A * | 4/1952 | James | B23D 53/12 |
| | | | | 30/371 |
| 2,696,228 | A * | 12/1954 | Bowen | B23D 57/0015 |
| | | | | 125/21 |
| 2,711,761 | A * | 6/1955 | Grants | B23D 53/12 |
| | | | | 123/198 R |
| 2,774,395 | A | 12/1956 | Tweedie | |
| 2,798,518 | A * | 7/1957 | Gray | B23D 53/12 |
| | | | | 30/374 |
| 2,876,809 | A * | 3/1959 | Rentsch | B23D 53/12 |
| | | | | 30/380 |
| 2,924,110 | A | 2/1960 | Gudmundsen | |
| 3,537,347 | A | 11/1970 | Rogers | |
| 3,590,892 | A * | 7/1971 | Ehlen | B23D 53/12 |
| | | | | 144/363 |
| 4,316,327 | A | 2/1982 | Scott et al. | |
| 4,382,334 | A | 5/1983 | Reynolds | |
| 4,470,438 | A * | 9/1984 | Obreanu | B23D 57/0076 |
| | | | | 144/35.2 |
| 4,649,644 | A * | 3/1987 | Huddleston | B23D 57/0076 |
| | | | | 30/122 |
| 4,819,335 | A * | 4/1989 | Alexander | B27B 17/14 |
| | | | | 30/122 |
| 4,821,415 | A | 4/1989 | Kress | |
| 5,413,158 | A * | 5/1995 | Wirth, Jr. | B23D 57/0076 |
| | | | | 144/35.2 |
| 5,850,698 | A * | 12/1998 | Hurn | B27B 9/00 |
| | | | | 30/275.4 |
| 5,875,826 | A * | 3/1999 | Giousos | B27B 17/02 |
| | | | | 144/136.95 |
| 6,264,211 | B1 * | 7/2001 | Granado | B23D 57/0076 |
| | | | | 173/29 |
| 6,401,346 | B1 * | 6/2002 | Roberts | B23D 53/12 |
| | | | | 30/380 |
| 6,408,730 | B1 * | 6/2002 | Tinner et al. | 83/832 |
| 7,131,205 | B2 * | 11/2006 | McDonnell | A61F 15/02 |
| | | | | 30/389 |
| 7,513,048 | B2 * | 4/2009 | De Salles | B23B 45/003 |
| | | | | 30/122 |
| 2005/0178010 | A1 * | 8/2005 | Petrenko | B27B 17/0083 |
| | | | | 30/383 |
| 2014/0102276 | A1 * | 4/2014 | Wysk | B23D 61/125 |
| | | | | 83/661 |

FOREIGN PATENT DOCUMENTS

| | | |
|---|---|---|
| CN | 2920593 Y | 7/2007 |
| CN | 101502973 A | 8/2009 |
| DE | 10 2006 062 001 A1 | 3/2008 |
| GB | 2 042 974 A | 10/1980 |
| GB | 2 162 463 A | 2/1986 |

* cited by examiner

POWER TOOL SYSTEM

This application is a 35 U.S.C. § 371 National Stage Application of PCT/EP2012/000953, filed on Mar. 2, 2012, which claims the benefit of priority to Serial No. DE 10 2011 005 015.9, filed on Mar. 3, 2011 in Germany, the disclosures of which are incorporated herein by reference in their entirety.

BACKGROUND

Machine-tool systems are already known which comprise a machine-tool parting device and a portable machine tool. Here, the machine-tool parting device comprises a cutting strand and a guide unit which forms a self-contained system together with the cutting strand. The portable machine tool has a motor unit that can be coupled to the cutting strand.

SUMMARY

The disclosure is based on a machine-tool system having at least one machine-tool parting device which has at least one cutting strand and at least one guide unit which forms a self-contained system at least together with the cutting strand, and having at least one portable machine tool which has a motor unit that can be coupled to the cutting strand.

It is proposed that, at least in a mounted state, a motor unit longitudinal axis of the motor unit runs at least substantially perpendicular to a longitudinal axis of the guide unit. Here, a "cutting strand" should be understood in particular to mean a unit which is provided for locally eliminating the atomic cohesion of a workpiece to be machined, in particular by means of a mechanical parting-off process and/or by means of a mechanical removal of material particles of the workpiece. The cutting strand is preferably provided for separating the workpiece into at least two physically separate parts and/or for at least partially parting off and/or removing material particles of the workpiece proceeding from a surface of the workpiece. The cutting strand is particularly preferably moved in a circulating manner, in particular along a circumference of the guide unit, in at least one operating state. Here, a "guide unit" should be understood in particular to mean a unit which is provided for exerting on the cutting strand a constraining force at least along a direction perpendicular to a cutting direction of the cutting strand in order to predefine a movement capability of the cutting strand along the cutting direction. In this connection, the expression "provided" should be understood in particular to mean specially configured and/or specially equipped. The guide unit preferably has at least one guide element, in particular a guide groove, through which the cutting strand is guided. As viewed in a cutting plane, the cutting strand is preferably guided through the guide unit along a full circumference of the guide unit by means of the guide element, in particular the guide groove. The guide unit is preferably in the form of a sword. Here, the expression "sword" is intended in particular to define a geometric shape which, as viewed in the cutting plane, has a closed outer contour which comprises at least two mutually parallel straight edges and at least two connecting portions, in particular circular arcs, which each connect facing ends of the straight edges to one another. Thus the guide unit has a geometric shape which, as viewed in the cutting plane, is composed of a rectangle and at least two circular sectors arranged at opposite sides of the rectangle.

Here, the expression "cutting plane" is intended in particular to define a plane in which the cutting strand, in at least one operating state, is moved relative to the guide unit along a circumference of the guide unit in at least two mutually oppositely directed cutting directions. It is preferable if, during the machining of a workpiece, the cutting plane is oriented at least substantially perpendicular to a workpiece surface to be machined. Here, the expression "at least substantially perpendicular" should be understood in particular to mean an orientation of a plane and/or of a direction relative to a further plane and/or a further direction which preferably deviates from a parallel orientation of the plane and/or of the direction relative to the further plane and/or the further direction. It is however also conceivable that, during the machining of a workpiece, the cutting plane is oriented at least substantially parallel to a workpiece surface being machined, in particular in the case of the cutting strand being in the form of a grinding means etc. Here, the expression "at least substantially parallel" should be understood in particular to mean an orientation of a direction relative to a reference plane, in particular in a plane, wherein the direction has a deviation of in particular less than 8°, advantageously less than 5° and particularly advantageously less than 2° with respect to the reference direction. Here, a "cutting direction" should be understood in particular to mean a direction along which, in at least one operating state, owing to a drive force and/or a drive torque, the cutting strand is moved, in particular in the guide unit, in order to generate a cutting gap and/or in order to part off and/or remove material particles of a workpiece to be machined. It is preferable if, in an operating state, the cutting strand is moved relative to the guide unit along the cutting direction. Here, the expression "self-contained system" is intended in particular to define a system which comprises at least two components, which components maintain functionality by way of interaction in a state in which the system is dismounted from a system superordinate to the system, such as for example a machine tool, and/or which components are captively connected to one another in the dismounted state. The at least two components of the self-contained system are preferably connected to one another at least substantially non-detachably for an operator. Here, the expression "at least substantially non-detachably" should be understood in particular to mean a connection of at least two components which can be severed only with the aid of parting tools, such as for example a saw, in particular a mechanical saw etc., and/or chemical parting means such as for example solvents etc.

Here, a "portable machine tool" should be understood in particular to mean a machine tool, in particular a handheld machine tool, which can be transported by an operator without the use of a transport machine. In particular, the portable machine tool has a mass of less than 40 kg, preferably less than 10 kg and particularly preferably less than 5 kg. Here, the expression "motor unit" is intended in particular to define a unit which is provided for generating forces and/or torques for driving the cutting strand. It is preferably the case that thermal energy, chemical energy and/or electrical energy is converted into kinetic energy by means of the motor unit for the purpose of generating forces and/or torques. In particular, the motor unit is designed such that it can be coupled directly and/or indirectly to the cutting strand. The motor unit particularly preferably comprises at least one stator and at least one rotor which has at least one armature shaft. Here, a "motor unit longitudinal axis" should be understood in particular to mean an axis of the motor unit, which axis runs at least substantially coaxially with respect to an axis of rotation of a drive shaft of the motor unit, in particular of an armature shaft of the motor unit. In particular, the motor unit has a maximum dimension along the motor unit longitudinal axis. Here, the expression "longitudinal axis" is intended in particular to define an axis along which a component, in particular the guide unit, has a maximum dimension. The longitudinal axis preferably runs at least substantially parallel to the two straight edges of the outer contour of the guide unit. Here, the expression "at least substantially perpendicular" is intended in particular to define an orientation of a direction relative to a reference plane, wherein the direction and the reference direction enclose an angle of 90°, in particular as viewed in a plane, and the angle has a maximum deviation of in particular less than 8°, advantageously less than 5° and particularly advantageously less than 2°. By means of the configuration of the machine-tool system according to the disclosure, it is advantageously possible to realize a compact machine tool.

It is also proposed that the portable machine tool has at least one support unit for support on a workpiece, in a mounted state the longitudinal axis of the guide unit extending through the support unit at least substantially perpendicular to a support surface of the support unit. Here, the expression "substantially perpendicular" is intended in particular to define an orientation of a direction relative to a reference direction, wherein the direction and the reference direction enclose an angle of 90°, in particular as viewed in a plane, and the angle has a maximum deviation of in particular less than 8°, advantageously less than 5° and particularly advantageously less than 2°. Here, a "support unit" should be understood in particular to mean a unit which is supported on the workpiece, in particular by way of the support surface of the support unit, during the machining of a workpiece by means of the portable machine tool and when the portable machine tool is being handled correctly, and which is provided for supporting the portable machine tool on the workpiece during the machining of the workpiece. The support unit is particularly preferably in the form of a sliding shoe and/or a base plate. The portable machine tool preferably slides on a surface of the workpiece to be machined by way of the support unit, in particular by way of the support surface of the support unit, during the machining of the workpiece. It is advantageously possible to attain guidance of the portable machine tool during the machining of a workpiece. Furthermore, it is advantageously possible to attain a high level of operating comfort for an operator during the machining of a workpiece by means of the portable machine tool.

It is advantageously the case that the motor unit longitudinal axis of the motor unit and the longitudinal axis of the guide unit in a mounted state are arranged at least substantially in a common plane. Here, the expression "arranged at least substantially in a common plane" should be understood in particular to mean an arrangement of the motor unit longitudinal axis and of the longitudinal axis such that the motor unit longitudinal axis and the longitudinal axis have, in at least one region, a spacing of less than 15 mm, preferably of less than 10 mm and particularly preferably of less than 5 mm, and intersect at at least one point. The motor unit longitudinal axis and the longitudinal axis preferably span the common plane. It is advantageously possible to attain a compact machine tool.

It is also proposed that the portable machine tool has a gearing unit which is in the form of an angular gearing. Here, the angular gearing may for example be in the form of a bevel-wheel gearing, a worm-wheel gearing, a crown-wheel gearing and/or some other angular gearing type that would appear expedient to a person skilled in the art. The motor unit is preferably coupled by means of the angular gearing to the cutting strand for the purpose of transmitting forces and/or torques for driving the cutting strand. The angular gearing particularly preferably has at least one drive output shaft for driving the cutting strand, which drive output shaft is connected rotationally conjointly to a gearwheel, such as for example a ring gear, a worm gear and/or a crown gear etc. The drive output shaft is preferably rotationally conjointly connected to the gearwheel of the angular gearing by means of a positively locking and/or non-positively locking connection. It is however also conceivable for the drive output shaft to be formed in one piece with the gearwheel. The drive output shaft is preferably formed by a shaft which differs from the drive input shaft of the motor unit. A transmission of forces and/or torques, which are generated by means of the motor unit, to the cutting train for the purpose of driving the cutting train can be realized in a structurally simple manner.

The machine-tool parting device advantageously has one torque transmission element which is mounted at least partially in the guide unit. The torque transmission element is preferably at least partially surrounded, along at least one direction, by outer walls of the guide unit. The torque transmission element preferably has a concentric coupling recess into which a pinion of the motor unit and/or a gearwheel and/or a toothed shaft of the gearing unit can engage in a mounted state. Here, the coupling recess is preferably formed by a hexagonal socket. It is however also conceivable for the coupling recess to be of some other configuration that would appear expedient to a person skilled in the art. By means of the configuration of the machine-tool parting device according to the disclosure, it is possible in a structurally simple manner to attain a self-contained system which can, by an operator, be mounted on a machine tool provided for the purpose in a comfortable manner. It is thus advantageously possible to dispense with the need for the operator to individually mount components, such as for example the cutting strand, the guide unit and the torque transmission element, in order to be able to use the machine-tool parting device according to the disclosure.

It is also proposed that the torque transmission element, at least in an uncoupled state, is arranged in the guide unit so as to be movable at least transversely with respect to a cutting direction of the cutting strand and/or along the cutting direction. Here, an "uncoupled state" should be understood in particular to mean a state of the torque transmission element and/or of the machine-tool parting device in which the torque transmission element is decoupled from a pinion of the motor unit and/or from a gearwheel and/or from a toothed shaft of the gearing unit and/or the machine-tool parting device is decoupled from a coupling device and/or from a tool receptacle of the portable machine tool. Here, the expression "movably arranged" is intended in particular to define an arrangement of the torque transmission element in the guide unit, wherein the torque transmission element, in particular in a manner decoupled by an elastic deformation of the torque transmission element, has a movement capability along at least an extent greater than 0.1 mm, preferably greater than 1 mm. It is advantageously possible for already existing components of the portable machine tool, such as for example a pinion of the motor unit and/or a gearwheel and/or a toothed shaft of the gearing unit, to be utilized for centering and/or mounting the torque transmission element when the torque transmission element is in a coupled state. It is furthermore advantageously possible to realize tensioning of the cutting strand when the torque transmission element is in a coupled state.

The cutting strand advantageously has at least one cutter carrier element which, on a side, facing toward a torque transmission element of the machine-tool parting device, of the cutter carrier element, has at least one recess into which, in at least one operating state, the torque transmission element engages for the purpose of driving the cutting strand. Here, the torque transmission element is preferably in the form of a gearwheel which, along a circumferential direction running in a plane perpendicular to the axis of rotation, has a multiplicity of teeth for the purpose of driving the cutting strand. The recess of the cutter carrier element is preferably formed correspondingly to an outer contour of the teeth of the torque transmission element in the form of a gearwheel. It is however also conceivable for the torque transmission element and/or the cutter carrier element to be of some other configuration that would appear expedient to a person skilled in the art. Forces and/or torques for driving the cutting strand can be transmitted to the cutter carrier element in a structurally simple manner.

It is also proposed that the cutter carrier element is of at least substantially circular-arc-shaped form at least on the side facing toward the torque transmission element. That side of the cutter carrier element which faces toward the torque transmission element in a mounted state is in particular of circular-arc-shaped configuration in at least one partial region between a central axis of the connecting element, which is arranged in and/or on the cutter carrier element, and a central axis of a connecting recess of the cutter carrier element for receiving the connecting element. The circular-arc-shaped sub-region is preferably formed adjacent to the recess into which the torque transmission element engages. The circular-arc-shaped sub-region particularly preferably has a radius which corresponds at least substantially to a radius of a redirecting contour of the guide unit, in particular a redirecting contour of a guide element, arranged on one convex end, of the guide unit. That side of the cutter carrier element which faces toward the torque transmission element in a mounted state, in particular the sub-region, is preferably of concave form. It is advantageously possible to attain a diversion of the cutter carrier element during operation of the machine-tool parting device. Furthermore, it is advantageously possible to realize a small redirecting radius for a redirection of the cutter carrier element.

The disclosure is also based on a machine-tool parting device, in particular a handheld machine-tool parting device, for a machine-tool system according to the disclosure, having at least one cutting strand and having at least one guide unit which forms a self-contained system at least together with the cutting strand. It is advantageously possible to realize a versatile tool for machining workpieces.

The disclosure is also based on a portable machine tool for a machine-tool system according to the disclosure, having a coupling device for positively locking and/or non-positively locking coupling at least to a machine-tool parting device according to the disclosure. It is advantageously possible to realize a portable machine tool which is particularly advantageously suitable for a broad range of applications.

Here, it is not the intention for the machine-tool parting device according to the disclosure and/or the portable machine tool according to the disclosure to be restricted to the usage and embodiment described above. In particular, the machine-tool parting device according to the disclosure and/or the portable machine tool according to the disclosure may, in order to attain functionality described herein, have a number of individual elements, components and units which differs from a number stated herein.

BRIEF DESCRIPTION OF THE DRAWINGS

Further advantages will emerge from the following description of the drawings. The drawings illustrate an exemplary embodiment of the disclosure. The drawings, the description and the claims contain numerous features in combination. A person skilled in the art will expediently also consider the features individually and combine them to form further meaningful combinations.

In the drawings.

DETAILED DESCRIPTION

Figure 1:
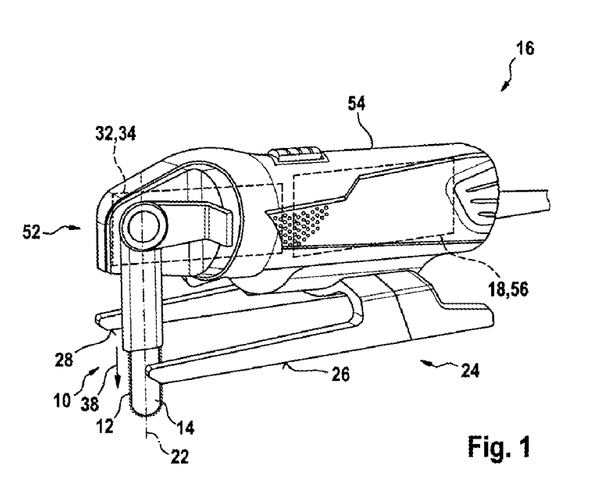
FIG. 1 shows a portable machine tool according to the disclosure, having a machine-tool parting device according to the disclosure, in a schematic illustration.

FIG. 1 shows a portable machine tool 16 having a machine-tool parting device 10, which machine tool and machine-tool parting device together form a machine-tool system. The portable machine tool 16 has a coupling device 52 for positively locking and/or non-positively locking coupling to the machine-tool parting device 10. Here, the coupling device 52 may be in the form of a bayonet connection and/or some other coupling device that would appear expedient to a person skilled in the art. Furthermore, the portable machine tool 16 has a machine-tool housing 54 which encloses a motor unit 18 and a gearing unit 32 of the portable machine tool 16. The motor unit 18 and the gearing unit 32 are operatively connected to one another, in a manner already known to a person skilled in the art, in order to generate a drive torque that can be transmitted to the machine-tool parting device 10. Here, the motor unit 18 and/or the gearing unit 32 are provided such that, in a mounted state, they are coupled to a cutting strand 12 of the machine-tool parting device 10 by means of the coupling device 52. The gearing unit 32 of the portable machine tool 16 is in the form of an angular gearing 34. The motor unit 18 is in the form of an electric motor unit 56. It is however also conceivable for the motor unit 18 and/or the gearing unit 32 to be of some other configuration that would appear expedient to a person skilled in the art. The motor unit 18 is provided for driving the cutting strand 12 of the machine-tool parting device 10 with a cutting speed of less than 6 m/s in at least one operating state. Here, the portable machine tool 16 has at least one operating mode in which it is made possible for the cutting strand 12 to be driven along a cutting direction 38 of the cutting strand 12 with a cutting speed of less than 6 m/s in a guide unit 14 of the machine-tool parting device 10. Furthermore, the portable machine tool 16 has a support unit 24 for support on a workpiece (not illustrated in any more detail here) to be machined by means of the portable machine tool 16. The support unit 24 is in the form of a sliding shoe and/or a base plate by means of which the portable machine tool 16 slides and/or is supported on a workpiece during the machining of the workpiece.

Figure 2:
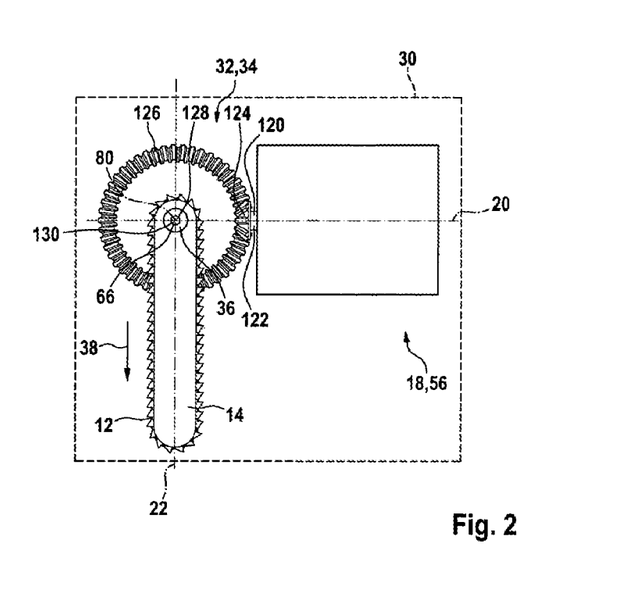
FIG. 2 shows a detail view of an arrangement of a motor unit of the machine tool according to the disclosure and of the machine-tool parting device according to the disclosure, in a schematic illustration.

FIG. 2 shows a detail view of an arrangement of the motor unit 18 of the portable machine tool 16 relative to the machine-tool parting device 10 when the machine-tool parting device 10 is in a mounted state. When the machine-tool parting device 10 is in a mounted state, a motor unit longitudinal axis 20 of the motor unit 18 runs at least substantially perpendicular to a longitudinal axis 22 of the guide unit 14. Here, the motor unit longitudinal axis 20 runs coaxially with respect to a drive shaft 120 of the motor unit 18. The drive shaft 120 is in the form of an armature shaft 122. As viewed in a cutting plane of the cutting strand 12, the longitudinal axis 22 of the guide unit 14 runs at least substantially parallel to two straight edges, which run at least substantially parallel, of an outer contour of the guide unit 14. Furthermore, the longitudinal axis 22 of the guide unit 14 in a mounted state extends through the support unit 24 at least substantially perpendicular at least to a support surface 26, 28 of the support unit 24. The motor unit longitudinal axis 20 of the motor unit 18 and the longitudinal axis 22 of the guide unit 14 are, in a mounted state, arranged at least substantially in a common plane 30.

For the purpose of driving the cutting strand 12 or for transmitting forces and/or torques from the motor unit 18 to the cutting strand 12, the armature shaft 122 has a pinion 124. The pinion 124 is connected rotationally conjointly to the armature shaft 122. In an operating state, the pinion 124 meshes with a gearwheel 126 of the gearing unit 32. Here, the gearwheel 126 is in the form of a ring gear. It is however also conceivable for the gearwheel 126 to be of some other configuration that would appear expedient to a person skilled in the art. The gearwheel is connected rotationally conjointly to a drive output shaft 128. The drive output shaft 128 has, on a side facing toward the cutting strand 12 in a mounted state, a toothed end 130 which is provided for being coupled directly and/or indirectly to the cutting strand 12 for the purpose of driving the cutting strand 12. The toothed end 130 is in the form of a hexagon.

Figure 3:
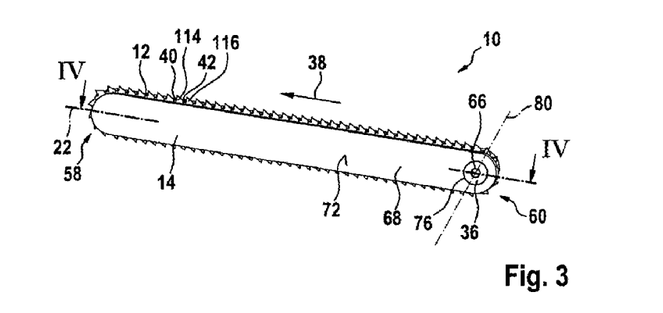
FIG. 3 shows a detail view of the machine-tool parting device according to the disclosure, in a schematic illustration.

FIG. 3 shows the machine-tool parting device 10 in a state in which it is decoupled from the coupling device 52 of the portable machine tool 16. The machine-tool parting device 10 has the cutting strand 12 and the guide unit 14 which, together, form a self-contained system. The guide unit 14 is in the form of a sword. Furthermore, the guide unit 14 has at least two convexly formed ends 58, 60 as viewed in the cutting plane of the cutting strand 12. The convexly formed ends 58, 60 of the guide unit 14 are arranged at sides of the guide unit 14 which face away from one another.

Figure 7:
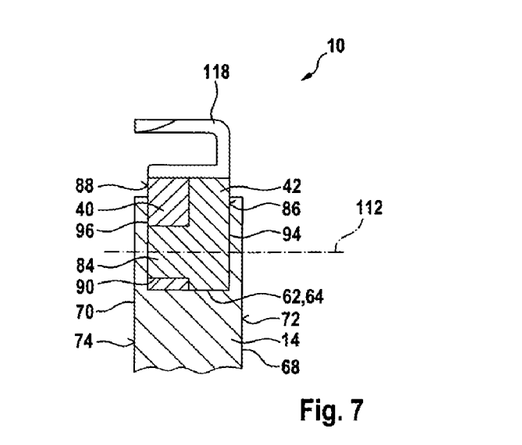
FIG. 7 shows a detail view of an arrangement of the cutter carrier elements in a guide unit of the machine-tool parting device according to the disclosure, in a schematic illustration.

The cutting strand 12 is guided by means of the guide unit 14. For this purpose, the guide unit 14 has at least one guide element 62 (FIG. 7) by means of which the cutting strand 12 is guided. The guide element 62 is in this case in the form of a guide groove 64 which extends, in a cutting plane of the cutting strand 12, along a full circumference of the guide unit 14. Here, the cutting strand 12 is guided by means of edge regions, which delimit the guide groove 64, of the guide unit 14. It is however also conceivable for the guide element 62 to be formed in some other way that would appear expedient to a person skilled in the art, for example as a rib-like formation on the guide unit 14, which formation engages into a recess on the cutting strand 12. As viewed in a plane running perpendicular to the cutting plane, the cutting strand 12 is surrounded on three sides by the edge regions that delimit the guide groove 64 (FIG. 7). During operation, the cutting strand 12 is moved relative to the guide unit 14 in a circulating manner along the circumference in the guide groove 64.

Furthermore, the machine-tool parting device 10 has a torque transmission element 36, which is mounted at least partially by means of the guide unit 14, for driving the cutting strand 12. Here, the torque transmission element 36 has a coupling recess 66 which, in a mounted state, can be coupled to the toothed end 130 of the drive output shaft 128. It is however also conceivable for the torque transmission element 36, in a coupled state, to be coupled directly to the pinion 124 of the motor unit 18 and/or the gearwheel 126 of the gearing unit 32 for the purpose of driving the cutting strand 12. The coupling recess 66 is arranged concentrically in the torque transmission element 36. The coupling recess 66 is in the form of a hexagonal socket. It is however also conceivable for the coupling recess 66 to have some other configuration that would appear expedient to a person skilled in the art.

Figure 4:
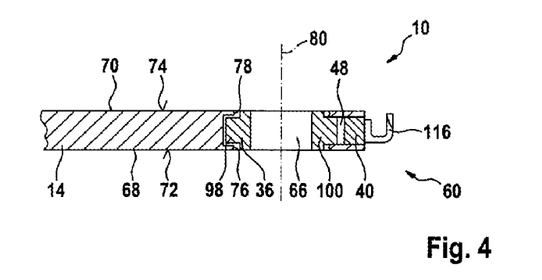
FIG. 4 shows a sectional view of the machine-tool parting device according to the disclosure along the line Iv-Iv from FIG. 3, in a schematic illustration.

In an uncoupled state, the torque transmission element 36 is arranged in the guide unit 14 so to be movable transversely with respect to the cutting direction 38 of the cutting strand 12 and/or along the cutting direction 38 (FIG. 4). Here, the torque transmission element 36 is arranged at least partially between two outer walls 68, 70 of the guide unit 14. The outer walls 68, 70 run at least substantially parallel to the cutting plane of the cutting strand 12. In outer surfaces 72, 74 of the outer walls 68, 70, the guide unit 14 has in each case one recess 76, 78 in which the torque transmission element 36 is at least partially arranged.

The torque transmission element 36 is arranged by way of a partial region in the recesses 76, 78 of the outer walls 70, 72. Here, at least in the sub-region arranged in the recesses 76, 78, the torque transmission element has, along an axis of rotation 80 of the torque transmission element 36, an extent which terminates flush with one of the outer surfaces 72, 74 of the guide unit 14. Furthermore, that sub-region of the torque transmission element 36 which is arranged in the recesses 76, 78 of the outer surfaces 72, 74 of the guide unit 14 has an outer dimension, extending at least substantially perpendicular to the axis of rotation 80 of the torque transmission element 36, which is at least 0.1 mm smaller than an inner dimension, extending at least substantially perpendicular to the axis of rotation 80 of the torque transmission element 36, of the recesses 76, 78. Along a direction running perpendicular to the axis of rotation 80, that sub-region of the torque transmission element 36 which is arranged in the recesses 76, 78 is in each case spaced apart from an edge, which delimits the respective recess 76, 78, of the outer walls 70, 72. Thus that sub-region of the torque transmission element 36 which is arranged in the recesses 76, 78 exhibits play within the recesses 76, 78.

Figure 5:
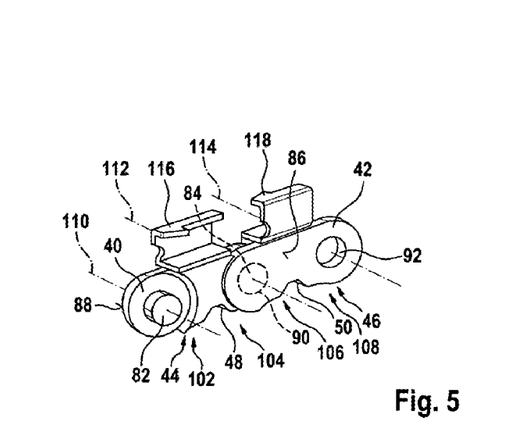
FIG. 5 shows a detail view of cutter carrier elements of a cutting strand of the machine-tool parting device according to the disclosure, in a schematic illustration.

FIG. 5 shows a detail view of cutter carrier elements 40, 42 of the cutting strand 12 of the machine-tool parting device 10. The cutting strand 12 comprises a multiplicity of interconnected cutter carrier elements 40, 42 which are connected to one another in each case by means of a connecting element 82, 84 of the cutting strand 12, said connecting element terminating substantially flush with one of two outer surfaces 86, 88 of one of the interconnected cutter carrier elements 40, 42 (cf. also FIG. 7). The connecting elements 82, are formed in the manner of journals.

When the cutting strand 12 is in a state in which it is arranged in the guide groove 64, the outer surfaces 86, 88 run at least substantially parallel to the cutting plane of the cutting strand 12. Depending on the application, a person skilled in the art will select a suitable number of cutter carrier elements 40, 42 for the cutting strand 12. The cutter carrier elements 40, 42 are in each case formed in one piece with one of the connecting elements 82, 84. Furthermore, the cutter carrier elements 40, 42 have in each case one connecting recess 90, 92 for receiving one of the connecting elements 82, 84 of the interconnected cutter carrier elements 40, 42. The connecting elements 82, 84 are guided by means of the guide unit 14 (FIG. 7). Here, when the cutting strand 12 is in a mounted state, the connecting elements 82, 84 are arranged in the guide groove 64. The connecting elements 82, 84 may be supported, as viewed in a plane running perpendicular to the cutting plane, on two side walls 94, 96 of the guide groove 64. The side walls 94, 96 delimit the guide groove 64 along a direction running perpendicular to the cutting plane. Furthermore, as viewed in the cutting plane, the side walls 94, 96 of the guide groove 64 extend outward from the guide unit 14 perpendicular to the cutting direction 38 of the cutting strand 12.

Figure 6:
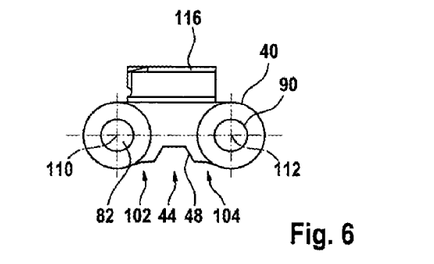
FIG. 6 shows a further detail view of one of the cutter carrier elements of the cutting strand of the machine-tool parting device according to the disclosure in a schematic illustration.

The cutter carrier elements 40, 42 of the cutting strand 12 have in each case one recess 48, 50 which, in each case in a mounted state, is arranged on a side 44, 46, which faces toward the torque transmission element 36, of the respective cutter carrier element 40, 42. In at least one operating state, the torque transmission element 36 engages into the recesses 48, 50 for the purpose of driving the cutting strand 12. The torque transmission element 36 is in this case in the form of a gearwheel. Thus the torque transmission element 36 comprises teeth 98, 100 which are provided such that, in at least one operating state, they engage into the recesses 48, 50 of the cutter carrier elements 40, 42 for the purpose of driving the cutting strand 12. Furthermore, those sides 44, 46 of the cutter carrier elements 40, 42 which face toward the torque transmission element 36 are of circular-arc-shaped form. Those sides 44, 46 of the cutter carrier elements 40, 42 which face toward the torque transmission element 36 in a mounted state are of circular-arc-shaped configuration in each case in partial regions 102, 104, 106, 108 as viewed between a central axis 110 of the respective connecting element 82, 84 and a central axis 112, 114 of the respective connecting recess 90, 92. The circular-arc-shaped sub-regions 102, 104, 106, 108 are formed in each case adjacent to the recesses 48, 50 into which the torque transmission element 36 engages. Here, the circular-arc-shaped sub-regions 102, 104, 106, 108 have a radius which corresponds to a radius of a profile of the guide groove 64 at the convex ends 58, 60. The sub-regions 102, 104, 106, 108 are of concave form (FIG. 6).

Furthermore, the cutting strand 12 has cutting elements 116, 118. The cutting elements 116, 118 are in each case formed in one piece with one of the cutter carrier elements 40, 42. A number of the cutting elements 116, 118 is dependent on a number of cutter carrier elements 40, 42. A person skilled in the art will select a suitable number of cutting elements 116, 118 depending on the number of cutter carrier elements 40, 42. The cutting elements 116, 118 are provided for permitting a parting-off and/or removal of material particles of a workpiece to be machined (not illustrated in any more detail here). The cutting elements 116, 118 may for example be formed as full-chisel, half-chisel or other cutter types that would appear expedient to a person skilled in the art, and which are intended for permitting a parting-off and/or removal of material particles of a workpiece to be machined. The cutting strand 12 is of endless form. Thus the cutting strand 12 is in the form of a cutting chain. The cutter carrier elements 40, 42 are in this case formed as chain links which are connected to one another by means of the journal-like connecting elements 82, 84. It is however also conceivable for the cutting strand 12, the cutter carrier elements 40, 42 and/or the connecting elements 82, 84 to be configured in some other way that would appear expedient to a person skilled in the art.

The invention claimed is:

1. A machine-tool system, comprising:
 a portable machine tool having a motor unit; and
 at least one machine-tool parting device including at least one cutting strand and at least one guide unit which forms a self-contained system at least together with the at least one cutting strand, the at least one machine-tool parting device configured to be mounted to and supported by the portable machine tool, wherein,
 when the at least one machine-tool parting device is mounted to and supported by the portable machine tool, a motor unit longitudinal axis of the motor unit runs at least substantially perpendicular to a longitudinal axis of the guide unit,
 the at least one guide unit is generally planar in a first plane,
 the motor unit longitudinal axis and the longitudinal axis of the guide unit in a mounted state are arranged at least substantially in a second plane parallel to the first plane,
 the portable machine tool includes a torque transfer shaft which defines a third longitudinal axis, the third longitudinal axis perpendicular to the first plane,
 the at least one machine-tool parting device has a torque transmission element mounted at least partially in the guide unit, and
 the torque transmission element, at least in an unmounted state, is arranged in the guide unit so as to be linearly movable with respect to the guide unit at least transversely with respect to a cutting direction of the cutting strand and/or along the cutting direction.

2. The machine-tool system as claimed in claim 1, wherein the portable machine tool has at least one support unit configured for support on a workpiece, the longitudinal axis of the guide unit in a mounted state extending through said support unit at least substantially perpendicularly at least with respect to a support surface of the support unit.

3. The machine-tool system as claimed in claim 1, wherein the portable machine tool has a gearing unit comprising a bevel gear.

4. The machine-tool system as claimed in claim 1, wherein the cutting strand has at least one cutter carrier element which, on a side of the cutter carrier element facing toward the torque transmission element of the machine-tool parting device, has at least one recess into which, in at least one operating state, the torque transmission element engages so as to drive the cutting strand.

5. The machine-tool system as claimed in claim 4, wherein the cutter carrier element is configured with at least a substantially circular-arc-shaped form at least on the side facing toward the torque transmission element.

6. The machine-tool system of claim 1, wherein the at least one cutting strand is a continuous loop cutting strand.

7. A machine-tool system, comprising:
 a portable machine tool having a motor unit with a first longitudinal axis; and
 at least one machine-tool parting device configured as a self-contained system to be mounted to and supported by the portable machine tool, the at least one machine-tool parting device including a cutting strand guided by a guide unit having a second longitudinal axis, the guided cutting strand defining a cutting plane, wherein when the at least one machine-tool parting device is mounted to the portable machine tool (i) the first longitudinal axis is substantially perpendicular to the second longitudinal axis, (ii) the first longitudinal axis and the second longitudinal axis are substantially arranged in a second plane parallel to the cutting plane, and (iii) the portable machine tool includes a torque transfer shaft which defines a third longitudinal axis, the third longitudinal axis perpendicular to the cutting plane, wherein the machine-tool parting device has a torque transmission element mounted at least partially in the guide unit, and the torque transmission element, at least in an unmounted state, is arranged in the guide unit so as to be linearly movable with respect to the guide unit at least transversely with respect to a cutting direction of the cutting strand and/or along the cutting direction.

8. The machine-tool system as claimed in claim 7, wherein the portable machine tool has at least one support unit configured for support on a workpiece, the second longitudinal axis in the mounted state extending through said support unit at least substantially perpendicularly with respect to a support surface of the support unit.

9. The machine-tool system as claimed in claim 7, wherein the portable machine tool has a gearing unit comprising a bevel gear.

10. The machine-tool system as claimed in claim 7, wherein the cutting strand has at least one cutter carrier element which, on a side of the cutter carrier element facing toward the torque transmission element of the machine-tool parting device, has at least one recess into which, in at least one operating state, the torque transmission element engages so as to drive the continuous loop cutting strand.

11. The machine-tool system as claimed in claim 10, wherein the cutter carrier element is configured with at least a substantially circular-arc-shaped form at least on the side facing toward the torque transmission element.

12. The machine-tool system of claim 7, wherein the cutting strand is a continuous loop cutting strand.

* * * * *

UNITED STATES PATENT AND TRADEMARK OFFICE
CERTIFICATE OF CORRECTION

PATENT NO. : 10,486,326 B2
APPLICATION NO. : 14/002837
DATED : November 26, 2019
INVENTOR(S) : Rudolf Fuchs Page 1 of 1

It is certified that error appears in the above-identified patent and that said Letters Patent is hereby corrected as shown below:

On the Title Page

Item (87) under the PCT Pub. Date, "Jul. 9, 2012" should read --Sep. 7, 2012--.

Signed and Sealed this
Tenth Day of March, 2020

Andrei Iancu
*Director of the United States Patent and Trademark Office*